Sept. 20, 1966  F. S. SAIZON  3,273,251
DEVICE FOR MEASURING THE UNEVENNESS OF A SURFACE
Filed Nov. 2, 1964  2 Sheets-Sheet 2

INVENTOR
FLOYD A. SAIZON
BY James B. Lake Jr.
ATTORNEY

United States Patent Office 3,273,251
Patented Sept. 20, 1966

3,273,251
DEVICE FOR MEASURING THE UNEVENNESS OF A SURFACE
Floyd S. Saizon, Baton Rouge, La., assignor to American Instruments Corporation, Baton Rouge, La.
Filed Nov. 2, 1964, Ser. No. 408,183
1 Claim. (Cl. 33—174)

The invention relates in general to measuring devices and more particularly to a device for measuring the mean heights of core samples for comparison to determine the unevenness of a surface referred to a standard base.

The invention is presently being tested to check sample cores taken from roads to compare performance of the builder against the specifications for the road.

In building roads it is often specified that the road should be of a given thickness and evenness of surface. After the completion of the road, vertical core samples are taken at random and measured to see if the specifications have been complied with. It has been customary to make a plurality of measurements of each core height at random points and average the measurements to get the mean height for each core. The mean core heights are then compared to see if they fall within the allowed tolerance for depth and evenness of surface of the road. The multiplicity of test cores and the measurements thereof required for checking any substantial length of road has resulted in much tediously repetitive measurements and computations for each core sample.

It is therefore an object of the invention to provide a measuring device which will simultaneously measure the height of a core sample at at least a pair of points and average the measurements to read out the mean height of the core.

Another object of the invention is to provide a measuring device for measuring the unevenness of one of two oppositely disposed surfaces of the same thing, using one of said surfaces as a reference plane for measuring the other.

Figure 1:
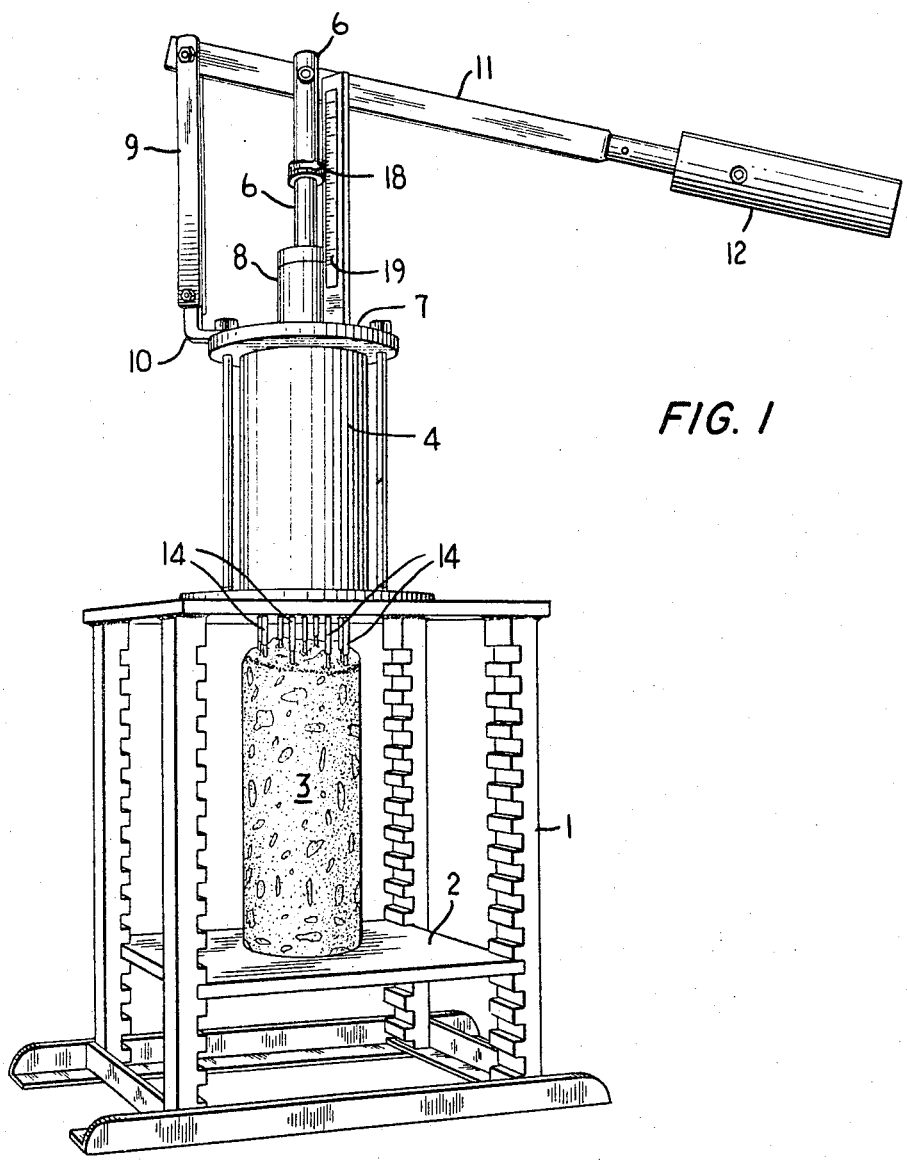
Figure 2:
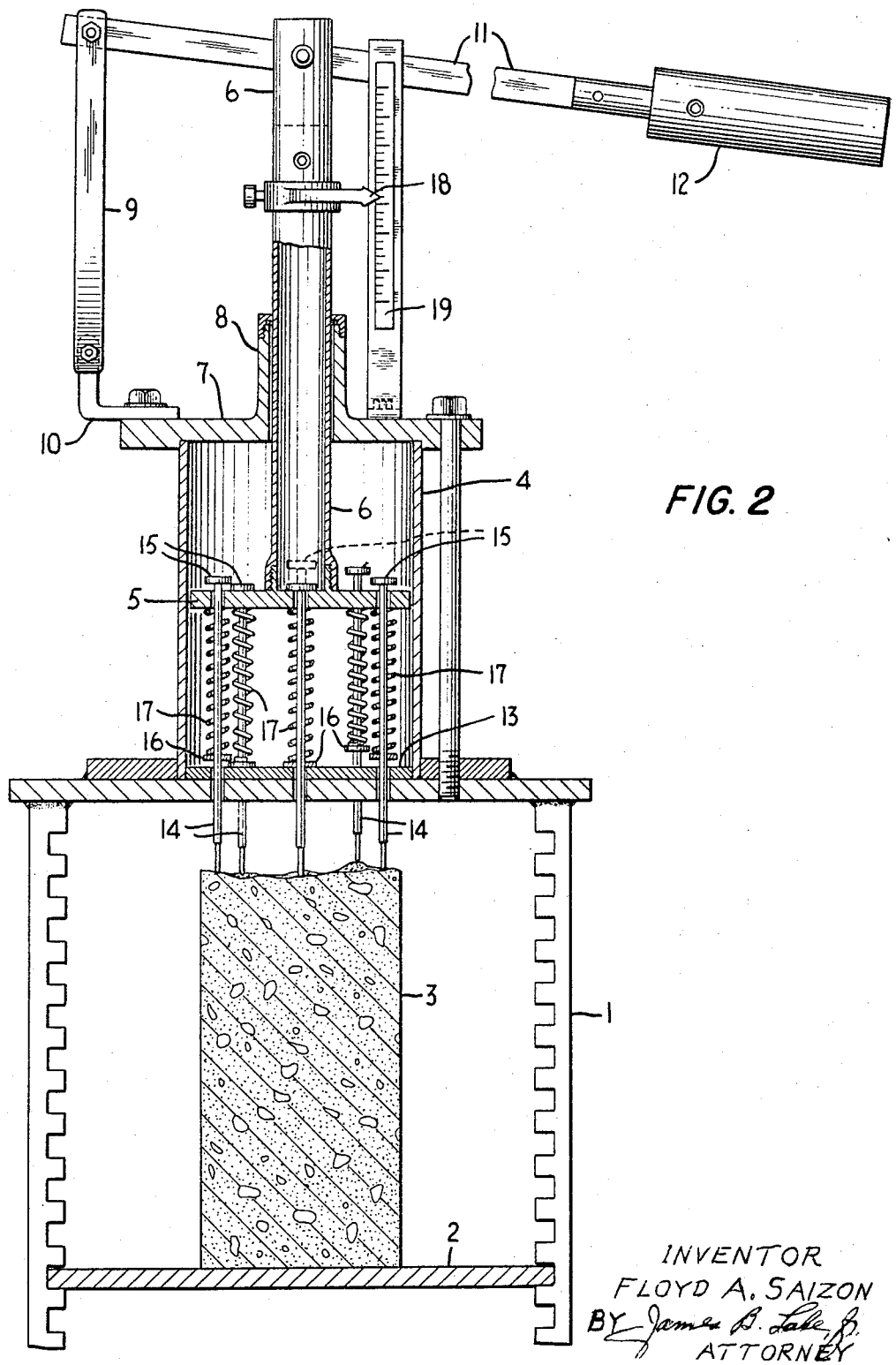

Other objects and a fuller understanding of the invention can be had by referring to the following description and claim, taken in conjunction with the accompanying drawings, in which:

FIGURE 1 shows a three dimensional view of the invention with a sample core supported for measurement, and FIGURE 2 shows a vertical sectional view of FIGURE 1.

With reference to FIGURE 1, the invention comprises a four-legged stand 1, with legs graduated vertically by a succession of equally spaced horizontal slots on their similarly facing sides. A base plate 2 for supporting a core sample 3 for measurement is constructed to slidably engage in horizontally coinciding slots most convenient for the height of the core sample. A cylinder 4 is vertically supported on the stand 1 above the core 3. Referring to FIGURE 2 a piston 5 is loosely and slidably mounted in cylinder 4 to allow free movement of the piston and the air in the cylinder. A hollow piston rod 6 is rigidly attached to the top of piston 5 and moves vertically with it. A cylinder cover 7 including a piston guide and bushing 8 covers the top of cylinder 4 and guides the piston 5 in vertical movement.

A linkage comprising two arms 9 and 11 are pivotally connected by one each of their two respective ends. A bracket 10 pivotally secures the other end of arm 9 to the cylinder cover 7. Arm 11 is pivoted intermediate its respective ends to the top portion of piston rod 6. A weighted handle 12 is secured to the free end of arm 11 for lifting the piston rod 6 and piston 5 in cylinder 4.

The cylinder 4 has a bottom 13 which defines at least a pair of holes congruent with coinciding ones defined in the top of the stand 1. The holes are defined at any convenient separate points in the circular area defined by the cylinder 4 on the cylinder bottom 13. The piston 5 defines similar holes to those in the bottom 13 and with corresponding holes being vertically in line. FIGURE 2 illustrates the piston and bottom having five holes. A probe 14 is reduced in radius at one end and has a flange 15 larger than the defined holes at the other end, and a similar flange intermediate the ends. A probe 14 is slidably mounted for vertical movement in each set of the vertically-in-line holes with flange 15 above piston 5 to prevent the probe from slipping past it, and flange 16 fixed to said probe intermediate piston 5 and bottom 13. A helical spring 17 is mounted around each of the probes 14 and between flange 16 and piston 5, each said spring resting on a flange 16 and directly and resiliently supporting piston 5, in cylinder 4 against the downward pressure exerted by the weighted handle 12. The probes 14 and the springs 17 are respectively identical in size and shape and the springs in resiliency as it is convenient to manufacture.

A horizontal pointer 18 is attached to piston rod 6 and is adjustable vertically thereon in accordance with the horizontal position of the base plate 2 as supported in the slotted legs of stand 1. A scale 19 is vertically mounted on the cylinder cover 7 diametrically opposite bracket 10 and pointer 18 with which it is arranged to cooperate.

To operate the invention, a core sample 3 is placed on base plate 2 on its flat reference surface and with the surface to be measured for unevenness uppermost. The slots to be used for horizontally supporting base plate 2 in order to bring the upper surface of core sample 3 within range of the vertical displacement of the probes 14 is determined so that the lowest point on the measured surface is not beyond the lowest range of the probes. The pointer 18 is vertically adjusted on the piston rod 6 to coordinate the scale with the supporting slots to directly read the distance between the upper and lower surfaces of core sample 3. The piston 5 is raised in the cylinder 4 by lifting the weighted handle 12 and the interconnected piston rod 6, probes 14 being also lifted by flanges 15 and the springs 17 by flanges 16. The base plate 2 with core sample 3 in place is slidably engaged in the previously determined coinciding leg slots of stand 1, thereby bringing the upper surface of core sample 3 within the displacement range of probes 14, when handle 12 is released. On release of the handle 12 the piston 5 and probes 14 descend, the probes making contact with their reduced ends at various points on the upper surface of core sample 3. The displacements of the respective probes compress their respective springs between flanges 16 and piston 5 proportionally and raise piston 5 a distance proportional to the mean displacement of the probes 14. The respective displacements are thus translated into proportional pressures the sum of which displaces the piston a distance equivalent to the mean pressure and hence equal to the mean of all the probe displacements. The pointer 18 having been set to the distance the base plate and lowest extending probe, the mean distance between surfaces of core sample 3 can be directly read on the scale. A comparison of the mean heights of a plurality of cores is a measure of the mean depth and evenness of the road.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

A mechanical measuring device for measuring the mean distance between a surface of an object and an opposite reference plane comprising in combination: a stand having a vertically adjustable base for supporting said object with said surface uppermost, and defining said reference plane, and having a top defining a plurality of vertically extending holes; a plurality of probes, each having oppositely disposed ends and an integral flange intermediate said ends, slidably mounted in said plurality of holes with said flanges above said top and adapted not to pass therethrough, said probes for contacting said surface with the lower of said oppositely disposed ends, said probes being displaced vertically by any unevenness of said surface; a plurality of helical springs, having similar coefficients of elasticity, mounted on the upper of said oppositely disposed ends of said probes and supported by said flanges; a horizontal member supported by said springs and adapted to freely move vertically, the vertical position of said horizontal member being a measure of the mean pressure of all said springs displaced with said probes by any unevenness of said surface; a horizontally extending indicator mounted on said horizontal member for indicating said spring supported height thereof; and a scale vertically mounted on said base adjacent said indicator and vertically coordinated with respect to said reference plane and calibrated for the coefficient of elasticity of said springs and numbered to read the mean height of said object as indicated by said indicator.

References Cited by the Examiner

UNITED STATES PATENTS

| | | | |
|---|---|---|---|
| 1,671,737 | 5/1928 | Norton | 33—147 |
| 2,028,503 | 1/1936 | Doherty | 33—147 |
| 2,551,440 | 5/1951 | Kreitner | 235—61 |

LEONARD FORMAN, *Primary Examiner.*